United States Patent [19]

Kowalczyk

[11] Patent Number: 4,702,753

[45] Date of Patent: * Oct. 27, 1987

[54] AIR PURIFIER-COMBINATION FILTER

[76] Inventor: Thaddeus Kowalczyk, 8163 Lochdale, Dearborn Hts., Mich. 48127

[ * ] Notice: The portion of the term of this patent subsequent to Sep. 9, 2003 has been disclaimed.

[21] Appl. No.: 940,352

[22] Filed: Dec. 11, 1986

Related U.S. Application Data

[63] Continuation-in-part of Ser. No. 854,548, Apr. 21, 1986, abandoned.

[51] Int. Cl.$^4$ .............................................. B01D 46/00
[52] U.S. Cl. ....................................... 55/267; 55/274; 55/279; 55/316; 98/2.11; 340/607
[58] Field of Search ................. 55/267, 274, 208, 316, 55/279; 340/521, 607, 632; 98/2.11

[56] References Cited

U.S. PATENT DOCUMENTS

| | | | |
|---|---|---|---|
| 3,261,147 | 7/1966 | Allander | 55/279 X |
| 4,014,209 | 3/1977 | Emerick | 55/274 X |
| 4,217,116 | 8/1980 | Seever | 55/212 X |
| 4,287,504 | 9/1981 | Simon et al. | 340/521 X |
| 4,382,440 | 5/1983 | Kapp et al. | 55/316 X |
| 4,544,380 | 10/1985 | Itou et al. | 55/80 |
| 4,610,703 | 9/1986 | Kowalczyk | 55/274 |
| 4,629,479 | 12/1986 | Cantoni | 55/274 |

Primary Examiner—Charles Hart

[57] ABSTRACT

This invention is a pollution cleansing system to be installed passenger motor vehicles for the protection of the occupants. This "Air Purifier-Combination Filter" will be installed in the plenum of the vent which is connected to the cowl plenum chamber of the heating-cooling system. The "Air Purifier-Combination Filter" is equipped with a sensor switch that notifies the driver whenever the filter becomes dirty and must be replaced, and with an electric heater which protects the filter from freezing and keeps the filter dry. The "Air Purifier" is located inside the container of the combination-filter, which is composed of three artificial fibers of appropriate quality and activated charcoal to remove pollutants from the air. The "Air Purifier-Combination Filter" prevent pollutants, which are emitted from the exhaust fumes of motor vehicles, odors, smoke, soot, dust and allergens-pollen from entering the motor vehicle interior. By installing the "Air Purifier-Combination Filter" in motor vehicle we can be assured of breathing purer air.

8 Claims, 3 Drawing Figures

AIR PURIFIER-COMBINATION FILTER

RELATED APPLICATIONS

This is a continuation-in-part application of U.S. Ser. No.: 854,548, filed Apr. 21, 1986 now abandoned and my earlier Patent, U.S. Pat. No. 4,610,703 date of Patent Sept. 9, 1986.

TECHNICAL FIELD

This invention relates to the use an "Air Purifier-Combination Filter" to clean the air which enters the motor vehicle interior. An "Air Purifier-Combination Filter" container is composed of appropriate quality artificial fibers water resistance and activated charcoal to remove pollutants emitted from the exhaust fumes of the motor vehicle, odors, smoke, soot, dust and allergens-pollen from the air which enters the motor vehicle interior. A sensor switch is mounted in the "Air Purifier-Combination Filter" which notifies the driver whenever the filter becomes dirty, also mounted is an electric heater which protects the filter from freezing, and keeps the filter dry.

BACKGROUND ART

The aim of the "Air Purifier-Combination Filter" invention as applied to passenger motor vehicles is to protect health and in certain cases prevent outright poisoning. The whole world is becoming one great highway owing to the greater availability of motor vehicle to people the world over. The only air that the driver and passengers can breathe is the air in the motor vehicle which enters the interior through inlets in the heating-cooling system. That air is polluted by the exhaust fumes emitted from the motors of passing motor vehicles. One of the best solution to this problem is to use an "Air Purifier-Combination Filter". The moment this invention finds greater use in motor vehicles, it will help prevent poisoning in certain cases and will certainly insure better health for motor vehicle drivers and passengers. It will be especially helpful for people suffering with emphysema and asthma. Also protect evaporator and heater core from clogged by dirt. This "Air Purifier-Combination Filter" is appropriate constructed which eliminates approximately 100% of the air pollution entering the motor vehicle and for long period use before become clogged with dirt. This "Air Purifier-Combination Filter" is a small and simple construction apparatus which is easy installed in all passenger motor vehicles, and the inside filter are replaceable.

Numerous prior art patents disclose apparatus for cleansing the pollution from the air entering the motor vehicle interior. For example, the U.S. Pat. No. 4,407,354 to Takashi Takishita; Shinji Sutoh discloses a vehicle temperature control apparatus which is not so simple and requires a more costly and difficult installation in existing motor passenger vehicles and does not notify the driver when the filter is clogged with dirt.

Similarly, the U.S. Pat. Nos. 4,531,453 to Warm and 4,451,435 to Holter disclose various types of the pollution cleaning systems.

There are numerous deficiencies of the prior art including the complexity and cost of the prior art apparatus. Also, the apparatus is bulky in construction and not suitable for passenger vehicles.

DISCLOSURE OF THE INVENTION

Many years have passed since the invention of the motor vehicle. Today, there are millions of them and increasingly more of those that make use of fuel, diesel fuel and alcohol. Built in various sizes, they burn various fuels and emit exhaust fumes that pollute the air, in particular certain older motor vehicles with improperly working engines which pollute the air even more. These motor vehicles are used for various purposes, to transport peoples in buses, for instance. Certain jobs require that we spend many hours in motor vehicles. Almost every person uses a motor vehicle for various reasons. In all of this we inhale polluted air. To this day, all that has been done to protect people from exhaust fumes is to have installed an exhaust system converter and returning a portion of the exhaust fumes returns for a secondary burning.

One of the greatest needs in our motor vehicle today is to install an "Air Purifier-Combination Filter" to clean the air pulled into our motor vehicle of pollutants. Such and "Air Purifier-Combination Filter" would be installed in the plenum of the vent which is connected to the cowl plenum chamber of the heating-cooling system, so that it would be in line with air entering the vehicle during motion and being pulled into the vehicle interior by the blower through the outside vent. This "Air Purifier-Combination Filter" is composed of a number of appropriate components that de-pollute the air and is constructed in such a way as to increase the surface of the filter. This "Air Purifier-Combination Filter" prevents the ingestion of pollutants emitted through exhaust fumes, odors, smoke, soot, dust and allergens-pollen from the air which enter the motor vehicle interior. This "Air Purifier-Combination Filter" eliminates approximately 100% of the air pollution and requires more force to suck in or blow in the appropriate amount of air. An additional vent appropriate constructed from the exterior of the motor vehicle and is connected to the cowl plenum chamber of the heating-cooling system in which the "Air Purifier-Combination Filter" is installed. When the motor vehicle is in motion this vent will allow the air to enter by dint of air resistance, so that the air will flow easily trough the filter and it will be easier for the blower inside it to suck and push the air into the interior of the motor vehicle. This system is adequate for vehicles moving at great speeds on longer trips. For motor vehicles moving at slower speeds (such as in populated areas) it is necessary to install an additional appropriate force vacuum-blower in the plenum in front of the "Air Purifier-Combination Filter" in order that an appropriate amount of air enter the interior of the motor vehicle. The container of this "Air Purifier-Combination Filter" is consist of two closed parts in which there is a replaceable filter. In one part of the container on the inlet side is mounted an insulator which consists of a replaceable filament wire. There is also a sensor switch in the other part of the container on the outlet side to inform the operator when the filter has to be changed. This sensor switch is closed by a spring to cause a warning light associated with the "Air Purifier-Combination Filter" to illuminate on the instrument panel. If the "Air Purifier-Combination Filter" is clean, use of the blower will cause the air to push away the sensor plate and prevent the warning light on the instrument panel from illuminating. When the "Air Purifier-Combination Filter" becomes dirty, the air being drawn by the blower will diminish in strength and not be able to move the sensor plate and, thereby, cause the warning light to illuminate.

BEST MODE FOR CARRYING OUT THE INVENTION

Figure 1:
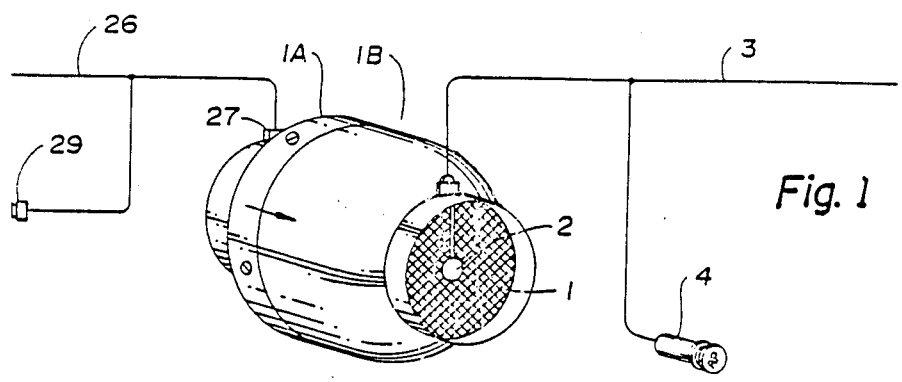
FIG. 1 is a rear slightly side view of the "Air Purifier-Combination Filter" which is built into the plenum of the vent connected to the cowl plenum chamber of the heating-cooling system. It also shows the sensor switch, which is connected by an electrical line to a warning light which is on the instrument panel, and the power supply line is connected to the insulator which contains an electric filament wire. This "Air Purifier-Combination Filter" can be round or square in form.
Figure 2:
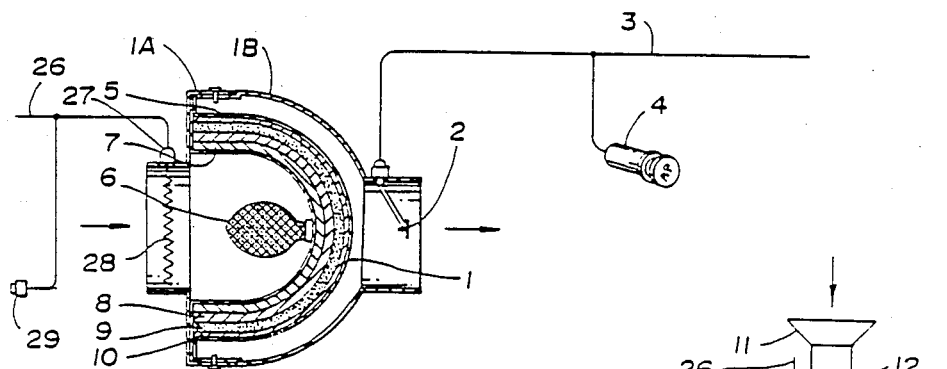
FIG. 2 shows the "Air Purifier-Combination Filter" in cross-section so as to demonstrate its construction. It reveals the four layers which increase the surface of the filter and shows how the sensor switch is mounted, and shows how the electric heater is mounted in the inlet side. The heater is connected by an electrical line to the electric switch which is inside the passenger compartment.
Figure 3:
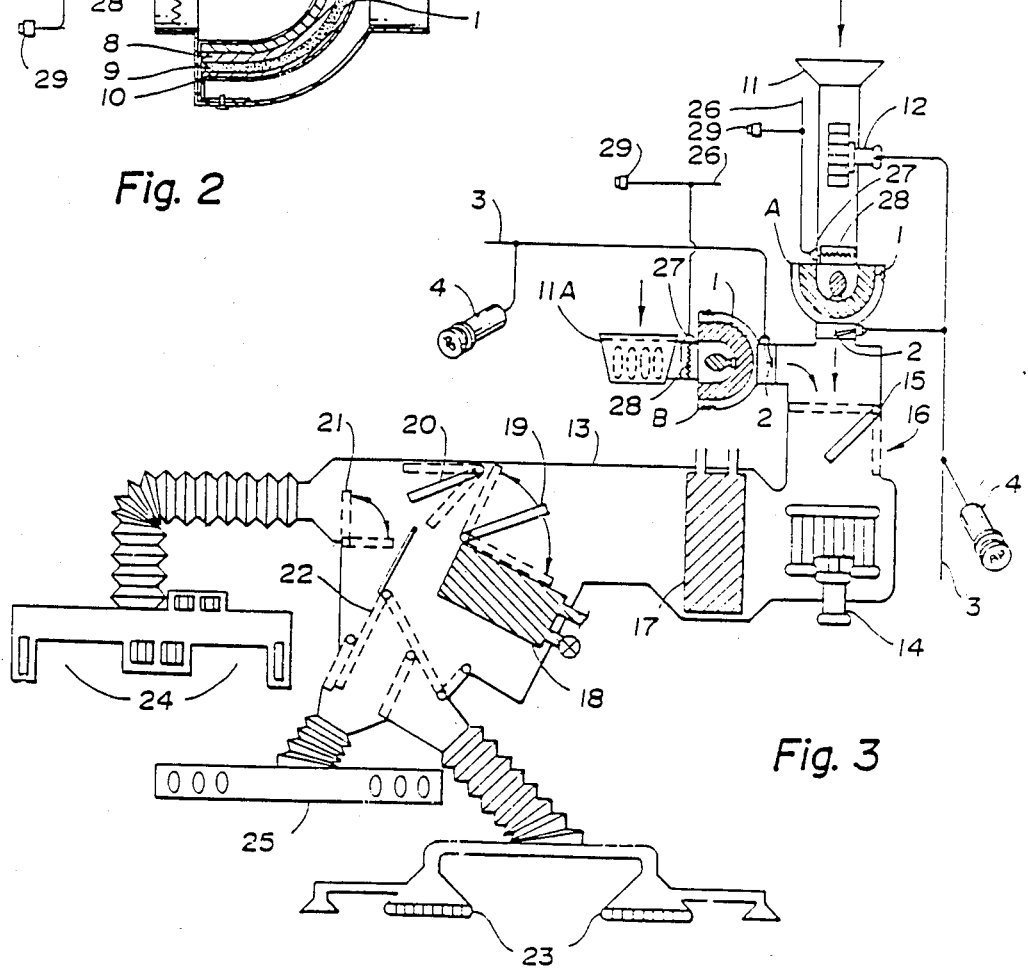
FIG. 3 is an overall diagnostic view showing the particular elements located in this air purifying and heating-cooling system. The "Air Purifier" system A or system B, illustrates the way in which the "Air Purifier-Combination Filter" and vacuum blower is installed and how the blower pulls the outside air into the interior, and shows how the evaporator which cools the air, the heater core which warms the air, and the doors which regulate the flow air to the appropriate outlets.

What follows is a detailed description of the invention illustrated in the drawing and the construction of the main and individual elements of this new invention. The "Air Purifier-Combination Filter" 1 is an construction which removes pollutants emitted from the exhaust fumes of motor vehicles, odors, smoke, soot, dust and allergens-pollen from the air for the benefit of the occupants of the motor vehicle. This "Air Purifier-Combination Filter" 1 is installed in the plenum of the vent 11 on system A or of the vent 11A on system B which is connected to the cowl plenum chamber in heating-cooling system in the air intake path. The container consist of two parts 1-A and 1-B which house the "Air Purifier-Combination Filter" 1, sensor switch 2, and electric filament wire 28, screen 5 surrounds four layers of filter components, screen 6 surrounds activated charcoal for absorb odors, which can be replaced, the first layer 7 a mass of the appropriate quality of artificial fibers laid out in such a way as to eliminate the larger particles of pollution, the second layer 8 a mass of the appropriate quality of artificial wool laid out in such a way as to eliminate smaller particles of pollution, a third layer 9 of activated charcoal laid out in such amounts as to absorb odors, and a fourth layer 10 a mass of the appropriate quality of artificial fibers laid out so as to eliminate the smallest particles of pollution. Sensor switch 2 is mounted adjacent to the "Air Purifier-Combination Filter" on the downstream air flow side in part of container 1-B. This sensor switch causes the warning light 4 window AP on the instrument panel to illuminate when the "Air Purifier-Combination Filter" becomes clogged with dirt. The electric supply line 3 connects the sensor switch 2 to the warning light 4 and to the blower 14, and to the vacuum-blower 12 in vent 11 on system A. The electric supply line 26 is connected to the electric filament wire 28 in insulator 27 which is mounted on the inlet side of the container in part 1-A, and to the electric switch 29 which is inside the passenger compartment. The auxiliary vent 11 in system A or auxiliary vent 11A in system B is connected to the cowl plenum chamber in the heating-cooling system. By being connected to the cowl plenum chamber vent 11 or vent 11A pulls air into the vehicle by means of air resistance, which makes it easier to obtain sufficient air. Heater plenum chamber 13 contains the necessary instruments that pull in air from the exterior, clean it, cool or heat it and conduct it to the appropriate outlets. Blower 14 pulls air in with appropriate force from the outside and forces it into the interior; door 15 is provided which allows the air from the outside to enter the vehicle from inlets 11 or 11A or through inlet 16 for recirculating the air. Use door 15 for recirculating the air we disconnected electric power to sensor switch 2 and vacuum-blower 12. Evaporator 17 cools the air; heater core 18 heats the air; an air mix door 19 is provided means of which we regulate the heating or cooling of the air, doors 20, 21, 22 are provided by means of which we regulate the flow of air to the defroster vents 23, front vents 24 and floor vents 25.

What is claimed is:

1. A pollution cleaning system for the passenger compartment of a motor vehicle, comprising:
   a plenum;
   a filter positioned in the plenum and including a housing containing a replaceable filter element having multiple layers providing a surface area for contact with air passing therethrough, to remove pollutants emitted from exhaust fumes and allergens-pollen from the air, and prevent such pollutants from entering the motor vehicle interior,
   an air inlet for introducing outside air into said plenum;
   a heater located between the air inlet and the filter to raise the temperature of the outside air by an amount necessary to protect the filter from freezing and to keep the filter dry and monitoring means for generating an electrical signal indicating that said filter is clogged with dirt, said monitoring means including a sensor switch having a movable sensor plate mounted on the downstream side of and in the path of air flowing through said filter so as to be moved to a first position in which said switch is open and said signals prevented from being generated, said monitoring means including means of biasing said sensor plate to a second position in the absence of sufficient air flow through said sensor switch generating said signal in response to the movement of said sensor plate to said second position.

2. The system of claim 1 further comprising a second filter element of activated charcoal located in the air path between said replaceable filter element and said heater.

3. The system of claim 1 including an additional vent on the exterior of the motor vehicle connected to the cowl plenum chamber of the heating-cooling system in which the filter is installed.

4. The system of claim 1, wherein the filter element is convex in shape to provide an increased surface area and wherein the multiple layers are made from water-resistant fibers and activated charcoal, to remove at least one of said types of pollutants which are emitted from the exhaust fumes of the motor vehicle: odors, smoke, soot, dust and allergens-pollen from the air which enter the motor vehicle interior.

5. The system of claim 1 wherein said housing has a plurality of openings therein through which air may pass in flowing from said inlet to said outlet, and consists of two closed parts which house the sensor switch, the heater, and the replaceable filter.

6. The system of claim 1, wherein the filter is installed in the plenum between the outside air vent inlet and cowl plenum chamber of the heating-cooling system of the vehicle.

7. The system of claim 1 further including a warning light in said passenger compartment which is energizable by said electrical signal to alert passengers that said filter is clogged.

8. The system of claim 7, wherein the heater includes a filament wire and wherein the system further comprises a source of electric power connected to the sensor switch, to the warning light, to the filament wire, and to the electric switch in the side passenger compartment.

* * * * *